(12) United States Patent
Carpenter et al.

(10) Patent No.: US 9,035,999 B2
(45) Date of Patent: May 19, 2015

(54) BANDWIDTH REDUCTION SYSTEM AND METHOD (71) Applicant: Google Inc., Mountain View, CA (US)

(72) Inventors: Thor Carpenter, Snoqualmie, WA (US); Chee Chew, Redmond, WA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/688,959

(22) Filed: Nov. 29, 2012

(65) Prior Publication Data
US 2014/0078246 A1 Mar. 20, 2014

Related U.S. Application Data (60) Provisional application No. 61/701,927, filed on Sep. 17, 2012.

(51) Int. Cl.
H04N 7/14 (2006.01)
H04N 7/15 (2006.01)
H04N 19/169 (2014.01)
H04N 19/103 (2014.01)
H04N 19/162 (2014.01)
H04N 19/164 (2014.01)

(52) U.S. Cl.
CPC ............... *H04N 7/15* (2013.01); *H04N 7/148* (2013.01); *H04N 19/169* (2013.01); *H04N 19/103* (2013.01); *H04N 19/162* (2013.01); *H04N 19/164* (2013.01)

(58) Field of Classification Search
CPC ..... H04N 7/15; H04N 7/147; H04N 21/2368; H04N 7/141; H04N 2007/145; H04N 21/44008; H04N 1/41; G06T 7/0083; H04M 3/567

USPC ....................... 348/14.13, 14.08, 14.09, 14.01
See application file for complete search history.

(56) References Cited

U.S. PATENT DOCUMENTS

| 6,535,238 | B1 * | 3/2003 | Kressin ....................... 348/14.01 |
| 6,804,227 | B1 | 10/2004 | Sone et al. |
| 2006/0215016 | A1 * | 9/2006 | Cohen et al. ............... 348/14.12 |
| 2008/0259154 | A1 * | 10/2008 | Garrison et al. ........... 348/14.01 |
| 2011/0279640 | A1 * | 11/2011 | Choi ........................... 348/14.12 |

FOREIGN PATENT DOCUMENTS

EP 1 840 875 A1 10/2007

OTHER PUBLICATIONS

International Search Report and Written Opinion for PCT/US2012/067035 mailed Jun. 20, 2013.

* cited by examiner

Primary Examiner — Stella Woo (57) ABSTRACT

A method and computing system for receiving an indication of a first user participating in a videoconference. A determination is made concerning whether bandwidth compression is preferable for the first user of the videoconference. If bandwidth compression is preferable for the first user of the videoconference: an unprocessed video stream associated with the first user is processed to generate a reduced bandwidth video stream, and the reduced bandwidth video stream is provided to a video encoder. Processing the unprocessed video stream includes performing an edge detection procedure on the unprocessed video stream.

19 Claims, 5 Drawing Sheets

BANDWIDTH REDUCTION SYSTEM AND METHOD

RELATED APPLICATION(S)

This application claims the benefit of U.S. Provisional Application Ser. No. 61/701,927, filed on 17 Sep. 2012, entitled Temporal Blurring System and Method, the contents of which are herein incorporated by reference.

TECHNICAL FIELD

This disclosure relates to video streams and, more particularly, to systems and methods for reducing video stream bandwidth requirements.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

One such use of the Internet is to allow people to videoconference with each other. As videoconferencing adds a video component to a communication session, such communication sessions tend to be more enjoyable for the participants. Unfortunately, videoconferencing requires communication channels that have comparatively high bandwidth. Further complicating the situation is that in many developing countries, such high-bandwidth communication channels are rare, often resulting in videoconference performance that is less than desirable.

SUMMARY OF DISCLOSURE

In one implementation, a computer-implemented method includes receiving an indication of a first user participating in a videoconference. A determination is made concerning whether bandwidth compression is preferable for the first user of the videoconference. If bandwidth compression is preferable for the first user of the videoconference: an unprocessed video stream associated with the first user is processed to generate a reduced bandwidth video stream, and the reduced bandwidth video stream is provided to a video encoder. If bandwidth compression is not preferable for the first user of the videoconference, the unprocessed video stream is provided to the video encoder. Processing the unprocessed video stream includes one or more of: performing an edge detection procedure on the unprocessed video stream, performing a resolution reduction procedure on the unprocessed video stream, performing a spatial blurring procedure on the unprocessed video stream, performing a temporal blurring procedure on the unprocessed video stream, performing an image quantization procedure on the unprocessed video stream, and performing a negating procedure on the unprocessed video stream.

In another implementation, a computer-implemented method includes receiving an indication of a first user participating in a videoconference. A determination is made concerning whether bandwidth compression is preferable for the first user of the videoconference. If bandwidth compression is preferable for the first user of the videoconference: an unprocessed video stream associated with the first user is processed to generate a reduced bandwidth video stream, and the reduced bandwidth video stream is provided to a video encoder. Processing the unprocessed video stream includes performing an edge detection procedure on the unprocessed video stream.

One or more of the following features may be included. If bandwidth compression is not preferable for the first user of the videoconference, the unprocessed video stream may be provided to the video encoder.

Processing the unprocessed video stream may further include performing a resolution reduction procedure on the unprocessed video stream. Processing the unprocessed video stream may further include performing a spatial blurring procedure on the unprocessed video stream. Processing the unprocessed video stream may further include performing a temporal blurring procedure on the unprocessed video stream. Processing the unprocessed video stream may further include performing an image quantization procedure on the unprocessed video stream. Processing the unprocessed video stream may further include performing a negating procedure on the unprocessed video stream.

Bandwidth compression may be preferable for the first user of the videoconference if one or more performance statistics associated with the first user do not meet a minimum performance threshold for the video conference. The minimum performance threshold may include one or more of a minimum computational threshold and a minimum bandwidth threshold. The videoconference may be executed within a social network.

In another implementation, a computing system including a processor and memory is configured to perform operations including receiving an indication of a first user participating in a videoconference. A determination is made concerning whether bandwidth compression is preferable for the first user of the videoconference. If bandwidth compression is preferable for the first user of the videoconference: an unprocessed video stream associated with the first user is processed to generate a reduced bandwidth video stream, and the reduced bandwidth video stream is provided to a video encoder. Processing the unprocessed video stream includes performing an edge detection procedure on the unprocessed video stream.

One or more of the following features may be included. If bandwidth compression is not preferable for the first user of the videoconference, the unprocessed video stream may be provided to the video encoder.

Processing the unprocessed video stream may further include performing a resolution reduction procedure on the unprocessed video stream. Processing the unprocessed video stream may further include performing a spatial blurring procedure on the unprocessed video stream. Processing the unprocessed video stream may further include performing a temporal blurring procedure on the unprocessed video stream. Processing the unprocessed video stream may further include performing an image quantization procedure on the unprocessed video stream. Processing the unprocessed video stream may further include performing a negating procedure on the unprocessed video stream.

Bandwidth compression may be preferable for the first user of the videoconference if one or more performance statistics associated with the first user do not meet a minimum performance threshold for the video conference. The minimum performance threshold may include one or more of a minimum computational threshold and a minimum bandwidth threshold. The videoconference may be executed within a social network.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
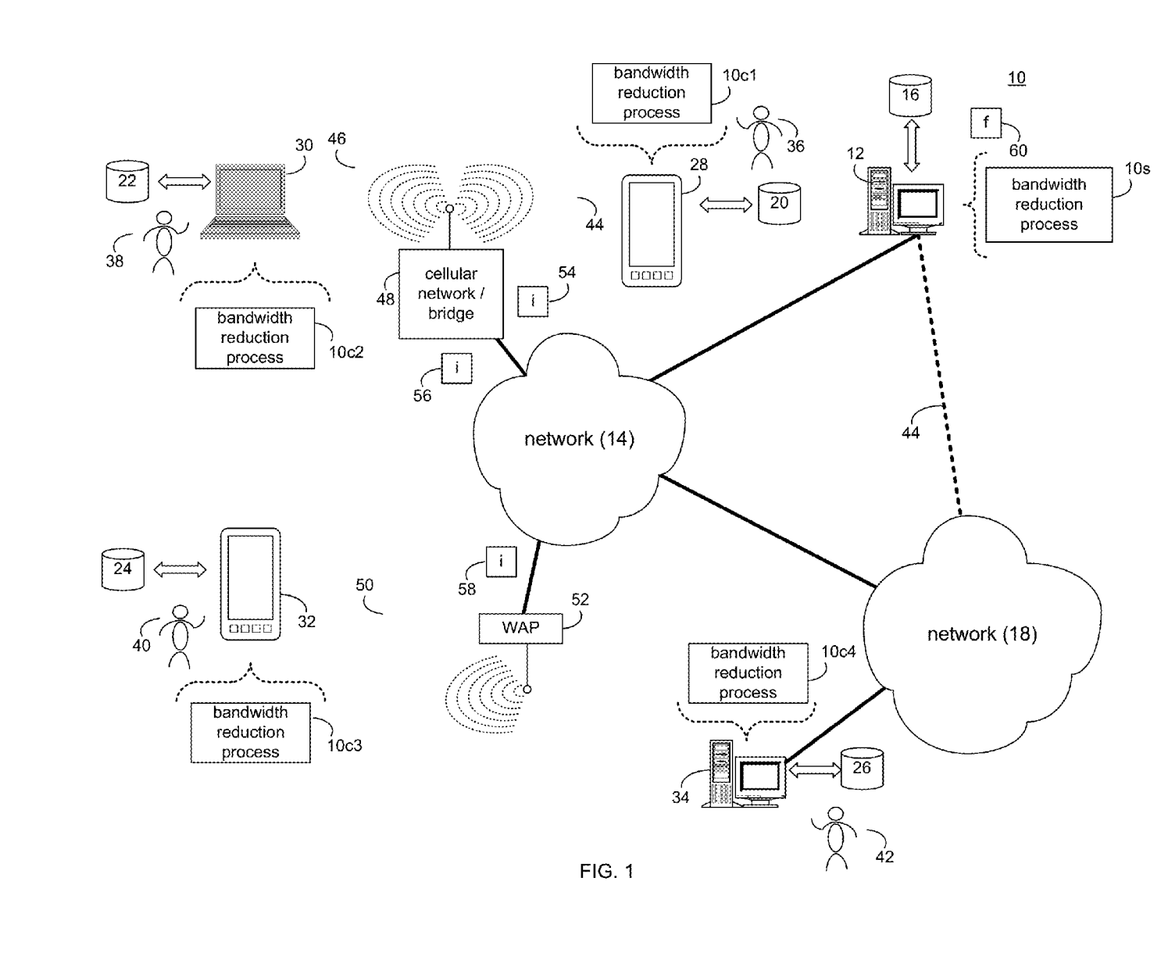
FIG. 1 is a diagrammatic view of a distributed computing network including a computing device that executes a bandwidth reduction process according to an implementation of the present disclosure.
Figure 2:
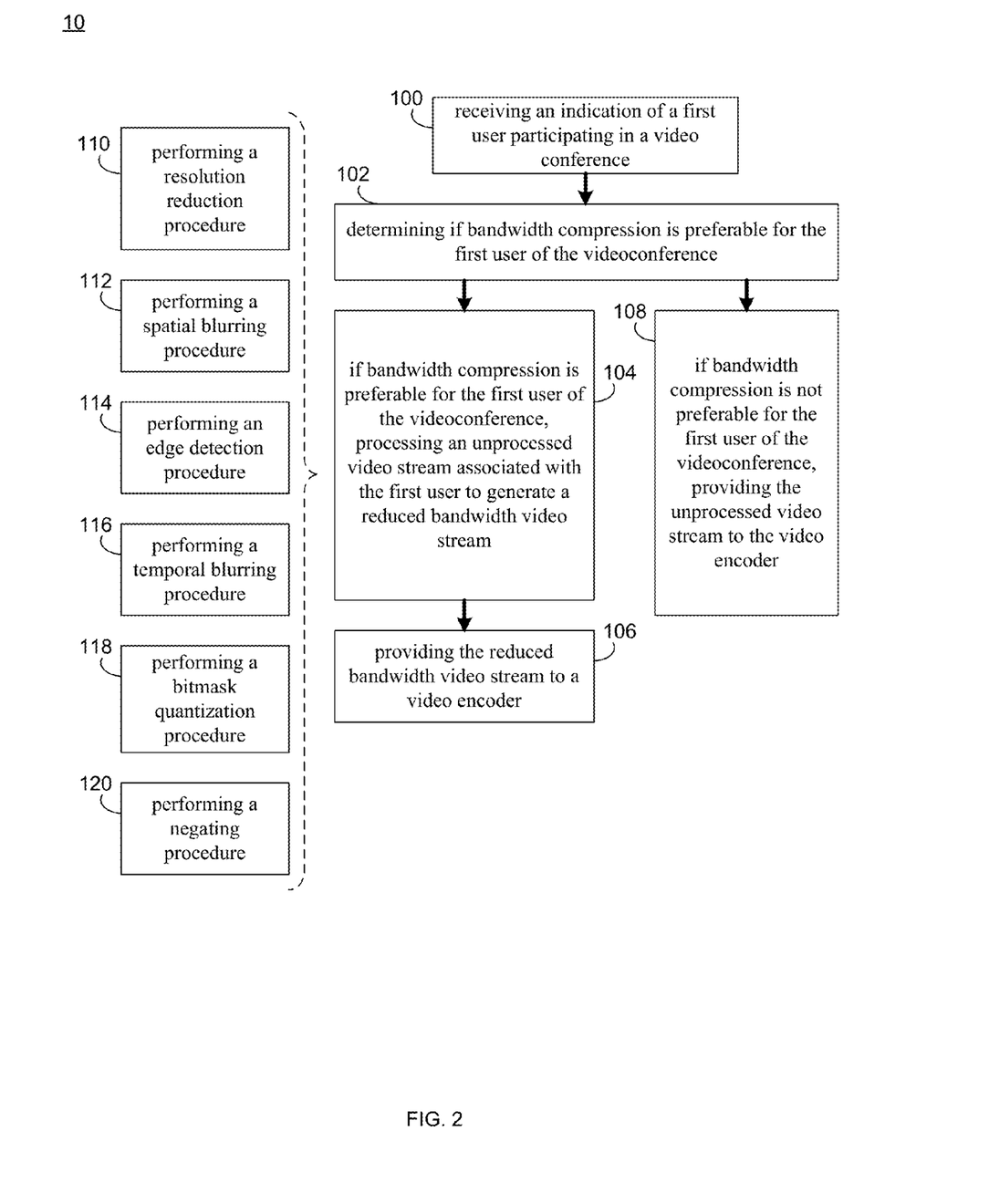
FIG. 2 is a flowchart of the bandwidth reduction process of FIG. 1 according to an implementation of the present disclosure.

In FIGS. 1 & 2, there is shown bandwidth reduction process 10. Bandwidth reduction process 10 may be implemented as a server-side process, a client-side process, or a hybrid server-side/client-side process. For example, bandwidth reduction process 10 may be implemented as a purely server-side process via bandwidth reduction process 10s. Alternatively, bandwidth reduction process 10 may be implemented as a purely client-side process via one or more of bandwidth reduction process 10c1, bandwidth reduction process 10c2, bandwidth reduction process 10c3, and bandwidth reduction process 10c4. Alternatively still, bandwidth reduction process 10 may be implemented as a hybrid server-side/client-side process via bandwidth reduction process 10s in combination with one or more of bandwidth reduction process 10c1, bandwidth reduction process 10c2, bandwidth reduction process 10c3, and bandwidth reduction process 10c4. Accordingly, bandwidth reduction process 10 as used in this disclosure may include any combination of bandwidth reduction process 10s, bandwidth reduction process 10c1, bandwidth reduction process 10c2, bandwidth reduction process 10c3, and bandwidth reduction process 10c4.

Concerning this disclosure, bandwidth reduction process 10 is disclosed, which is a novel way of reducing the bandwidth requirements of a videoconference. Specifically, upon bandwidth reduction process 10 receiving 100 an indication of a first user participating in a videoconference, a determination 102 may be made concerning whether bandwidth compression is preferable for the first user of the videoconference.

If bandwidth compression is preferable for the first user of the videoconference: an unprocessed video stream associated with the first user may be processed 104 by bandwidth reduction process 10 to generate a reduced bandwidth video stream and the reduced bandwidth video stream may be provided 106 to a video encoder. When processing 104 the unprocessed video stream, an edge detection procedure may be performed on the unprocessed video stream.

Bandwidth reduction process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of bandwidth reduction process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of bandwidth reduction processes 10c1, 10c2, 10c3, 10c4 may include but are not limited to a web browser, a game console user interface, a video conference user interface, or a specialized application (e.g., an application running on e.g., the Android™ platform or the iPhone™ platform). The instruction sets and subroutines of bandwidth reduction processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access bandwidth reduction process 10 directly through network 14 or through secondary network 18. Further, bandwidth reduction process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks may be able to participate in group communication sessions. For example, Google+™ allows users of this social network to participate in "hangouts", which are multiuser videoconferences that allow for virtual gatherings of people so that they may chat about specific topics. While the above discussion concerns Google+™, this is for illustrative purposes only and is not intended to be a limitation of this disclosure. For example, bandwidth reduction process 10 may be included within or utilized by any social network.

Figure 3:
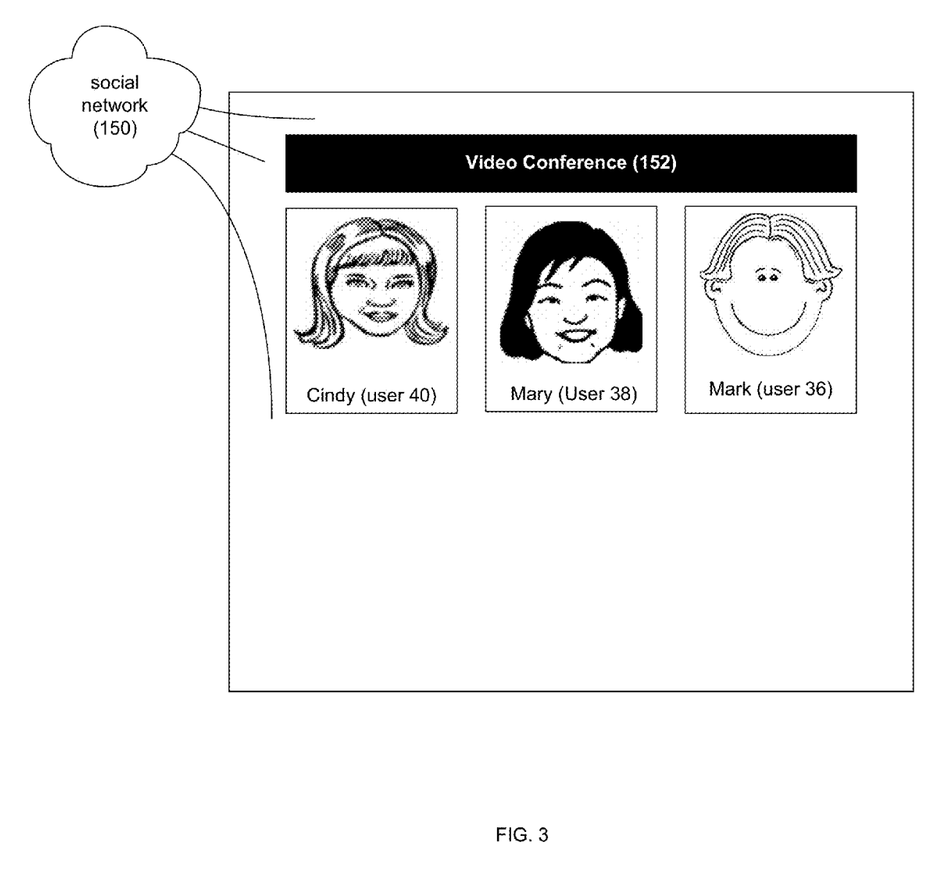
FIG. 3 is a diagrammatic view of a videoconference managed by the bandwidth reduction process of FIG. 1 according to an implementation of the present disclosure.

Referring also to FIG. 3, assume for illustrative purposes that users 36, 38, 40, 42 are all members of social network 150. Further assume that users 36, 38, 40 wish to participate in videoconference 152. While the following discussion concerns videoconference 152 being executed within social network 150, this is for illustrative purposes only and is not intended to be a limitation of this disclosure, as other configurations are possible. For example, videoconference 152 may occur outside of social network 150 by way of e.g. a stand-alone communications application/product (not shown). For illustrative purposes, further assume that videoconference 152 will occur through computing device 12, where (in this example) users 36, 38, 40 will access videoconference 152 via client electronic devices 28, 30, 32 (respectively). Further, assume that videoconference 152 (as used in this disclosure) is intended to cover any form of video transmission, such as peer-to-peer video transmission, peer-to-many video transmission, or communal video transmission.

Assume for illustrative purposes that users 38, 40 are geographically located in an area in which high bandwidth Internet connections are available between (in this example) client electronic devices 30, 32 and computing device 12. Further assume that user 36 is geographically located in an area in which a high bandwidth Internet connection may not be available between (in this example) client electronic device 28 and computing device 12.

Additionally and for this example, assume that client electronic devices 30, 32 (as used by users 38, 40, respectively) are high-end devices that are fully capable of encoding a high bandwidth video stream for use in videoconference 152. Further assume that client electronic device 28 (as used by user 36) is a device that may not be fully capable of encoding a high bandwidth video stream for use in videoconference 152. Accordingly and continuing with the above-stated example, assume that users 36, 38, 40 each indicate (e.g. via client electronic devices 28, 30, 32 respectively) an intention to participate in videoconference 152, thus generating indications 54, 56, 58 respectively. Bandwidth reduction process 10 may receive 100 an indication (e.g. indications 54, 56, 58) that users 36, 38, 40 (respectively) wish to participate in videoconference 152.

As is known, the quality of videoconference 152 may be highly dependent upon the computational performance of the individual client electronic devices (e.g. client electronic devices 28, 30, 32) and the bandwidth available for communication channels that are established between the client electronic devices (e.g. client electronic devices 28, 30, 32) and computing device 12.

Accordingly and to ensure a high-quality and enjoyable videoconference, bandwidth reduction process 10 may determine 102 if bandwidth compression is preferable for the participants (e.g., users 36, 38, 40) in videoconference 152.

For example, bandwidth compression may be preferable for the participants (e.g., users 36, 38, 40) of videoconference 152 if one or more the participants (e.g., users 36, 38, 40) selected to always use bandwidth compression. For example, bandwidth reduction process 10 may be configured to allow a user to select whether or not they wish to use bandwidth compression. Further, bandwidth compression may automatically be used if the last videoconference utilized bandwidth compression.

Alternatively, bandwidth compression may be preferable for the participants (e.g., users 36, 38, 40) of videoconference 152 if one or more performance statistics associated with the participants do not meet a minimum performance threshold for the video conference. Examples of these minimum performance thresholds may include but are not limited to one or more of a minimum bandwidth threshold and/or a minimum computational threshold.

The minimum bandwidth threshold may define a minimum bandwidth requirement for the communication channels established between the client electronic devices (e.g. client electronic devices 28, 30, 32) and computing device 12. The minimum computational threshold may define a minimum computational speed requirement for the client electronic devices (e.g. client electronic devices 28, 30, 32). Typically, the above-described minimum thresholds may be defined so that failure to meet one of the above-describe minimum thresholds may result in videoconference 152 being of low-quality.

Accordingly and in such a configuration, upon receiving 100 each of indications 54, 56, 58, bandwidth reduction process 10 may determine 102 if bandwidth compression is preferable by determining whether the above-referenced bandwidth performance statistic and computational performance statistic meet the above-described minimum performance thresholds.

The above-described bandwidth performance statistic may be determined by bandwidth reduction process 10 in various ways. For example, a file (e.g. file 60) having a known size may be stored on e.g. storage device 16 of computing device 12. Upon receiving e.g. indication 54 from client electronic device 28, file 60 may be transferred from computing device 12 to client electronic device 28 and, subsequently, from client electronic device 28 to computing device 12. As file 60 has a known size, bandwidth reduction process 10 may calculate a bidirectional bandwidth to determine whether the performance statistic associated with the communication channel established between client electronic device 28 and computing device 12 meets the above-described minimum bandwidth threshold. An example of this minimum bandwidth threshold may be 100 kb per second.

The above-described computational performance statistic may be determined by bandwidth reduction process 10 in various ways. For example, upon receiving indication 54 from client electronic device 28, bandwidth reduction process 10 may execute one or more performance benchmark applications (not shown) on client electronic device 28 to determine if client electronic device 28 meets the above-described minimum computational threshold. An example of this minimum computational threshold may be 15 frames per second, with 30 frames per second being desirable.

Figure 4:
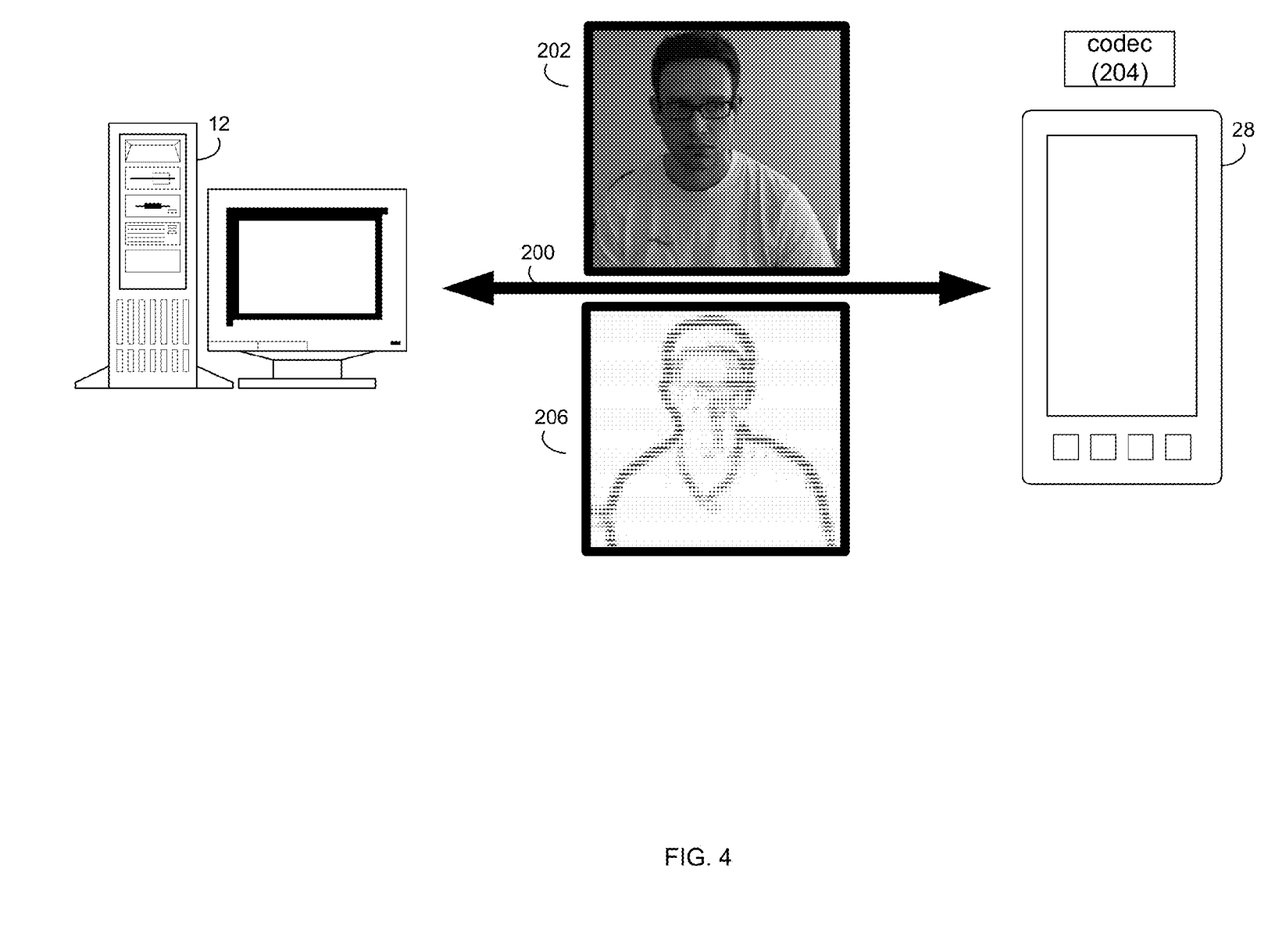
FIG. 4 is another diagrammatic view of a videoconference managed by the bandwidth reduction process of FIG. 1 according to an implementation of the present disclosure.

Referring also to FIG. 4, assume that bandwidth reduction process 10 receives 100 indication 54 from client electronic device 28 (associated with user 36) and is in the process of determining whether the above-described performance statistics (e.g., bandwidth performance statistic and/or computational performance statistic) associated with user 36 in videoconference 152 meet the above-described minimum performance thresholds. Assume for illustrative purposes that communication channel 200 is established between client electronic device 28 and computing device 12.

In the event that the above-described performance statistics (e.g., bandwidth performance statistic and/or computational performance statistic) associated with e.g., user 36 do meet the minimum performance thresholds for videoconference 152, bandwidth reduction process 10 may provide 108 unprocessed video stream 202 to video encoder 204 included within client electronic device 28 for transmission upon communication channel 200. Examples of video encoder 204 may include but are not limited to: the H.264 codec, the WMV codec and the DIVX codec.

However, in the event that the above-described performance statistics associated with e.g. user 36 do not meet the minimum performance thresholds for videoconference 152: bandwidth reduction process 10 may process 104 unprocessed video stream 202 associated with e.g. user 36 to generate reduced bandwidth video stream 206 and may provide 106 reduced bandwidth video stream 206 to video encoder 204 included within client electronic device 28 for transmission upon communication channel 200.

Depending upon the manner in which bandwidth reduction process 10 is configured, reduced bandwidth video stream 206 may be e.g. a grayscale image video stream, a grayscale silhouette video stream, a binary image video stream, or a binary silhouette video stream. The manner in which bandwidth reduction process 10 processes 104 unprocessed video stream 202 to generate reduced bandwidth video stream 206 is discussed below in greater detail.

When processing 104 unprocessed video stream 202, bandwidth reduction process 10 may perform 110 a resolution reduction procedure on unprocessed video stream 202. For example, unprocessed video stream 202 may have a native resolution of 640×360 pixels. Accordingly, when processing 104 unprocessed video stream 202, bandwidth reduction process 10 may perform 110 a resolution reduction procedure on unprocessed video stream 202 to reduce the resolution of unprocessed video stream 202 from 640×360 pixels to 160×90 pixels. Accordingly, a 75% reduction in the number of horizontal pixels and a 75% reduction in the number of vertical pixels may result in a video stream that is 1/16 its original size (i.e. 25%×25%).

When processing 104 unprocessed video stream 202, bandwidth reduction process 10 may perform 112 a spatial blurring procedure on unprocessed video stream 202. For example, bandwidth reduction process 10 may perform 112 a Gaussian blurring procedure when processing 104 unprocessed video stream 202. As is known in the art, a Gaussian blurring procedure (also known as Gaussian smoothing) is a mathematical process in which an image is blurred in accordance with a Gaussian function. For example, for any given pixel within an image, one or more pixels surrounding the given pixel may be averaged and the given pixel may be replaced with the average pixel value.

Gaussian blurring may be used on graphic images (e.g., video frames) to reduce image noise and/or reduce image detail. Visually, the Gaussian blurring procedure may result in a smooth blurring technique that resembles the viewing of an image through a translucent filter.

When processing 104 unprocessed video stream 202, bandwidth reduction process 10 may perform 114 an edge detection procedure on unprocessed video stream 202. For example, bandwidth reduction process 10 may perform 114 a Sobel edge detection procedure when processing 104 unprocessed video stream 202.

Edge detection using the Sobel operator may be used in image processing, which technically is a discrete differentiation operator that computes an approximation of the gradient of the image intensity function. At each point in the image, the result of the Sobel operator may be either the corresponding gradient vector or the norm of this vector.

Specifically, the Sobel operator may calculate the gradient of the image intensity at each point within the image, giving the direction of the largest possible increase from light to dark and the rate of change in that direction. This relates how "abruptly" or "smoothly" the image changes at any given point in the image and, therefore, how likely it is that this particular portion of the image represents an edge (and the orientation of the same).

When processing 104 unprocessed video stream 202, bandwidth reduction process 10 may perform 116 a temporal blurring procedure on unprocessed video stream 202. For example, when processing 104 unprocessed video stream 202, bandwidth reduction process 10 may perform 116 a temporal blurring procedure such as the procedure described in U.S. Provisional Application No. 61/701,927, entitled Temporal Blurring System and Method, and filed on 17 Sep. 2012 (the contents of which are herein incorporated by reference and are attached hereto as APPENDIX A).

In a fashion similar to the above-described spatial blurring procedure, temporal blurring may determine the average of a plurality of pixels and use that average to replace a given pixel. However, unlike spatial blurring, which determines the average of geographically proximate pixels (i.e., those pixels that are located proximate the given pixels within the same video frame), temporal blurring averages pixels that are temporally proximate the given pixel. Specifically, temporal blurring takes the average of pixels in temporally adjacent video frames that correspond to the given pixel. Accordingly, pixel #113 within video frame T−1 may be averaged with pixel #113 in video frame T+1, and this calculated average may be used to populate pixel #113 within video frame T.

When processing 104 unprocessed video stream 202, bandwidth reduction process 10 may perform 118 an image quantization procedure on unprocessed video stream 202.

An image quantization procedure, as used in image processing, is a lossy compression technique achieved by compressing a range of values to a single quantum value. When the number of discrete symbols in a given video stream is reduced, the video stream may become more compressible, thus reducing bandwidth requirements. For example, reducing the number of colors required to represent a digital image within a video stream may reduce the bandwidth requirements of the video stream. Examples of such an image quantization procedure may include but are not limited to bitmask DCT (i.e., Discrete Cosine Transform) data quantization in JPEG and DWT (i.e., Discrete Wavelet Transform) data quantization in JPEG 2000.

As discussed above, color quantization may reduce the number of distinct colors used within an image, usually with the intention of the new image being as visually similar as possible to the original image. Color quantization may be used to display images having many colors on devices that can only display a limited number of colors (e.g., due to memory limitations) and/or to allow efficient compression of certain types of images (e.g., discrete video frames within a video stream).

When processing 104 unprocessed video stream 202, bandwidth reduction process 10 may perform 120 a negating procedure on unprocessed video stream 202, which essentially allows the user to choose between e.g., reduced bandwidth video stream 206 (as shown in FIG. 4) and essentially the photonegative of reduced bandwidth video stream 206. Specifically, reduced bandwidth video stream 206 may be rendered by bandwidth reduction process 10 as a dark greyscale silhouette (of the person shown in unprocessed video stream 202) on a light background. However and through the use of the above-described negating procedure, user 36 may choose to have reduced bandwidth video stream 206 rendered by bandwidth reduction process 10 as a light greyscale silhouette (of the person shown in unprocessed video stream 202) on a dark background.

While reduced bandwidth video stream 206 is shown to include a greyscale silhouette, this is for illustrative purposes only and is not intended to be a limitation of this disclosure, as other configurations are possible. For example, reduced bandwidth video stream 206 may be rendered by bandwidth reduction process 10 to include a binary silhouette (in which the pixels in the silhouette are a first binary state (e.g., black or white) and the background is a second binary state (e.g., white or black).

Figure 5:
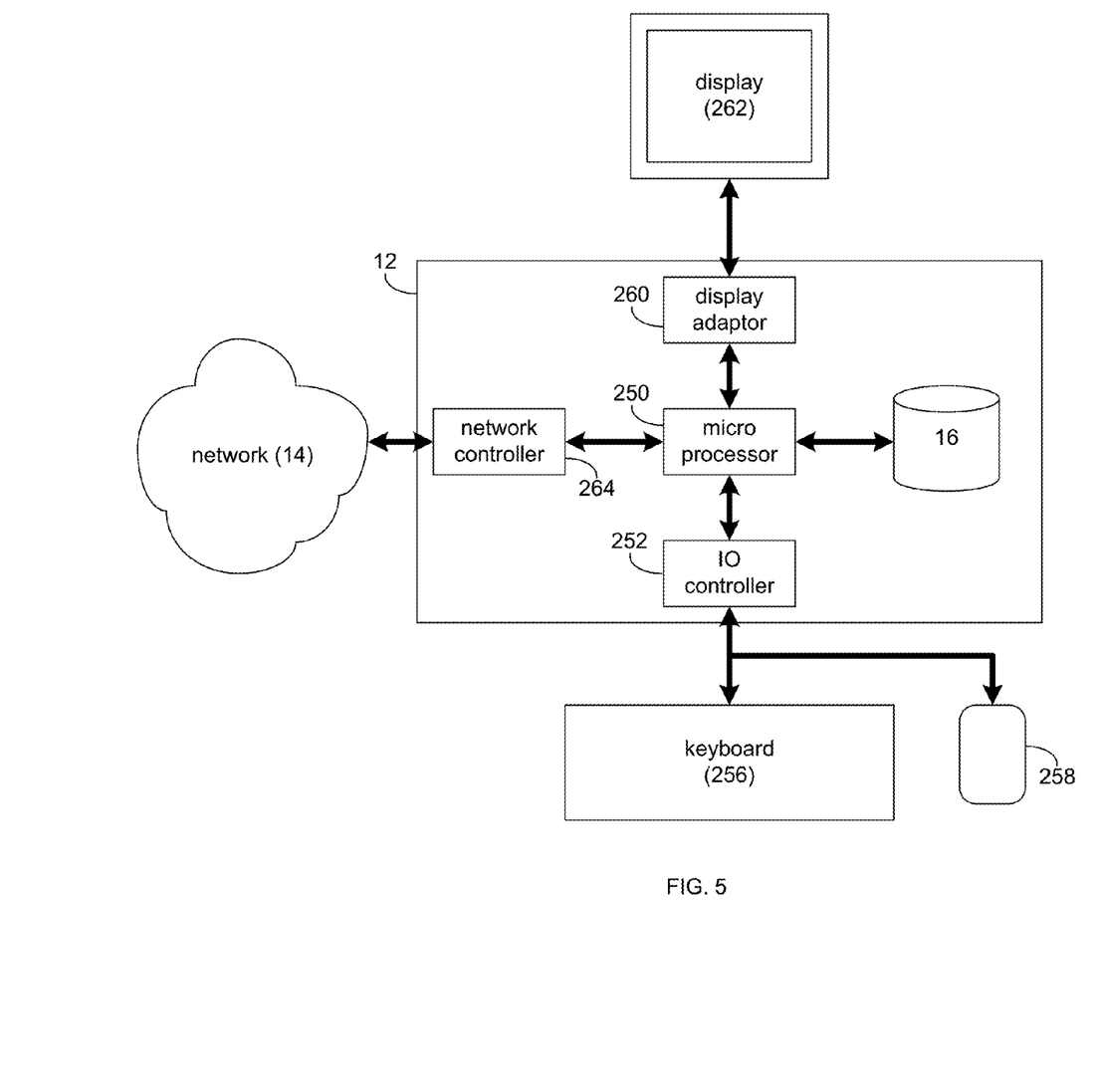
FIG. 5 is a diagrammatic view of the computing device of FIG. 1 according to an implementation of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, bandwidth reduction process 10 may be substituted for computing device 12 within FIG. 5, examples of which may include but are not limited to client electronic devices 28, 30, 32, 34.

Computing system 12 may include microprocessor 250 configured to e.g., process data and execute instructions/code for bandwidth reduction process 10. Microprocessor 250 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 252 may be configured to couple microprocessor 250 with various devices, such as keyboard 256, mouse 258, USB ports (not shown), and printer ports (not shown). Display adaptor 260 may be configured to couple display 262 (e.g., a CRT or LCD monitor) with microprocessor 250, while network adapter 264 (e.g., an Ethernet adapter) may be configured to couple microprocessor 250 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 250) of a general purpose computer/special purpose computer/other programmable data processing apparatus (e.g., computing device 12), such that the instructions, which execute via the processor (e.g., processor 250) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving an indication of a first user participating in a videoconference;
   determining if bandwidth compression is preferable for the first user of the videoconference;
   if bandwidth compression is preferable for the first user of the videoconference:
      processing an unprocessed video stream associated with the first user to generate a reduced bandwidth video stream, and
      providing the reduced bandwidth video stream to a video encoder;
   if bandwidth compression is not preferable for the first user of the videoconference, providing the unprocessed video stream to the video encoder;
   wherein processing the unprocessed video stream includes performing an edge detection procedure, performing a temporal blurring procedure, and one or more of:
      performing a resolution reduction procedure on the unprocessed video stream,
      performing a spatial blurring procedure on the unprocessed video stream,
      performing an image quantization procedure on the unprocessed video stream, and
      performing a negating procedure on the unprocessed video stream.

2. A computer-implemented method comprising:
   receiving an indication of a first user participating in a videoconference;
   determining if bandwidth compression is preferable for the first user of the videoconference; and
   if bandwidth compression is preferable for the first user of the videoconference:
      processing an unprocessed video stream associated with the first user to generate a reduced bandwidth video stream, and
      providing the reduced bandwidth video stream to a video encoder;
   wherein processing the unprocessed video stream includes performing an edge detection procedure and a temporal blurring procedure on the unprocessed video stream.

3. The computer-implemented method of claim 2 further comprising:
   if bandwidth compression is not preferable for the first user of the videoconference, providing the unprocessed video stream to the video encoder.

4. The computer-implemented method of claim 2 wherein processing the unprocessed video stream further includes performing a resolution reduction procedure on the unprocessed video stream.

5. The computer-implemented method of claim 2 wherein processing the unprocessed video stream further includes performing a spatial blurring procedure on the unprocessed video stream.

6. The computer-implemented method of claim 2 wherein processing the unprocessed video stream further includes performing an image quantization procedure on the unprocessed video stream.

7. The computer-implemented method of claim 2 wherein processing the unprocessed video stream further includes performing a negating procedure on the unprocessed video stream.

8. The computer-implemented method of claim 2 wherein bandwidth compression is preferable for the first user of the videoconference if one or more performance statistics associated with the first user do not meet a minimum performance threshold for the video conference.

9. The computer-implemented method of claim 8 wherein the minimum performance threshold includes one or more of a minimum computational threshold and minimum bandwidth threshold.

10. The computer-implemented method of claim 2 wherein the videoconference is executed within a social network.

11. A computing system including a processor and memory configured to perform operations comprising:
- receiving an indication of a first user participating in a videoconference;
- determining if bandwidth compression is preferable for the first user of the videoconference;
- if bandwidth compression is preferable for the first user of the videoconference:
  - processing an unprocessed video stream associated with the first user to generate a reduced bandwidth video stream, and
  - providing the reduced bandwidth video stream to a video encoder;

wherein processing the unprocessed video stream includes performing an edge detection procedure and a temporal blurring procedure on the unprocessed video stream.

12. The computing system of claim 11 further configured to perform operations comprising:
- if bandwidth compression is not preferable for the first user of the videoconference, providing the unprocessed video stream to the video encoder.

13. The computing system of claim 11 wherein processing the unprocessed video stream further includes performing a resolution reduction procedure on the unprocessed video stream.

14. The computing system of claim 11 wherein processing the unprocessed video stream further includes performing a spatial blurring procedure on the unprocessed video stream.

15. The computing system of claim 11 wherein processing the unprocessed video stream further includes performing an image quantization procedure on the unprocessed video stream.

16. The computing system of claim 11 wherein processing the unprocessed video stream further includes performing a negating procedure on the unprocessed video stream.

17. The computing system of claim 11 wherein bandwidth compression is preferable for the first user of the videoconference if one or more performance statistics associated with the first user do not meet a minimum performance threshold for the video conference.

18. The computing system of claim 17 wherein the minimum performance threshold includes one or more of a minimum computational threshold and minimum bandwidth threshold.

19. The computing system of claim 11 wherein the videoconference is executed within a social network.

* * * * *